United States Patent [19]

Vaello

[11] Patent Number: 4,797,914
[45] Date of Patent: Jan. 10, 1989

[54] TELEPHONE DISPLAY

[75] Inventor: Donald B. Vaello, San Antonio, Tex.

[73] Assignee: North American Industries, Inc., San Antonio, Tex.

[21] Appl. No.: 64,315

[22] Filed: Jun. 17, 1987

[51] Int. Cl.[4] .......................................... H04M 11/00
[52] U.S. Cl. ........................................ 379/96; 379/155
[58] Field of Search ................ 379/96, 122, 136, 142, 379/143, 155, 53, 355, 84, 453, 441, 110

[56] References Cited

U.S. PATENT DOCUMENTS

| | | | |
|---|---|---|---|
| D. 260,702 | 9/1981 | Hannula et al. | D6/20 |
| D. 263,101 | 2/1982 | George et al. | D6/157 |
| D. 263,264 | 2/1982 | George et al. | D6/157 |
| 3,324,245 | 6/1967 | Stenhammar. | |
| 3,384,888 | 5/1968 | Harnden et al. | 340/339 |
| 4,071,698 | 1/1978 | Barger, Jr. et al. | 379/84 |
| 4,121,052 | 10/1978 | Richard | 379/96 |
| 4,242,539 | 12/1980 | Hashimoto | 379/142 |
| 4,443,664 | 4/1984 | Gange | 379/355 |
| 4,582,956 | 4/1986 | Doughty | 379/96 |
| 4,669,109 | 5/1987 | LeCheviller et al. | 379/143 |
| 4,698,840 | 10/1987 | Dively et al. | 379/155 |

FOREIGN PATENT DOCUMENTS 0062262  4/1985  Japan ................................ 379/96

Primary Examiner—Gerald L. Brigance
Assistant Examiner—Richard Hjerpe
Attorney, Agent, or Firm—Gunn, Lee & Jackson

[57] ABSTRACT

A telephone display which can be programmed from a remote site. A standard pay telephone is equipped with a modem, processor, and memory storage devices whereby it can receive a character string transmitted over telephone lines from a remote programming site. The processor displays messages embedded in the character string on a display panel attached to the telephone booth, and optionally on an interior display panel removed from the telephone booth. The character string has format controls for displaying the messages, and may also have clock commands for displaying certain messages at certain times of the day. A priority message is flashed on the display panel whenever the telephone handset is removed from its cradle.

15 Claims, 4 Drawing Sheets

Ø13187Ø33ØD1^NSUNØ6ØØ-113ØHAVE△A△NICE△
DAY$#*^HON△SALE△NOW^WHOT△DOGS△$1.25^F
^X^HCHECK△OUT△OUR.....^NSUN1131-24ØØ....

TELEPHONE DISPLAY

BACKGROUND OF THE INVENTION

1. Field of the Invention

The present invention generally relates to advertising displays, and more particularly to a display used in conjunction with a public telephone.

2. Description of the Prior Art

Every marketing strategist appreciates the immense potential of advertising. The most significant means of advertising products is displaying the ad at the point of purchase, and is most effective when placed in a location designed to confront the consumer face to face.

In this regard, many people have recognized the availability of public telephone booths as a medium for advertising. For example, J. R. George and W. L. Schuyler of Denton, Maryland, have designed several combined telephone booth/advertising display units, depicted in U.S. Pat. Nos. Des. 263,264, Des. 263,101, and Des. 263,102. The advertising panels are usually placed above the booth, or at eye level as shown is U.S. Pat. No. Des. 260,702, issued to L. A. Hannula.

None of these patents, however, disclose the use of an electronic display board in conjunction with a telephone booth. One such display board is described in U.S. Pat. No. 3,384,888, issued to Harnden et al. These display boards are commonplace, and are used to communicate a wide variety of information, from stock market quotes to prices at the local fast-food restaurant. They are usually operated via a direct connection to a control processor. They may be programmed to present a number of different messages in several different display formats.

In addition to the absence of booths having electronic billboards, no prior art devices show the ability to program these message boards via telephone lines. Of course, recording units have been devised which allow callers to leave messages on tape. One such device, disclosed in U.S. Pat. No. 4,443,664, issued to R. A. Gange, allows the caller to leave digital messages and correct them. Along another vein, modems have been used for years to assist computer operators in communicating over long distances with standard telephone lines. In fact, modems and processing units have been used in pay telephones in the past to run diagnostics on the electronics of the telephone, to check the amount of money deposited therein, and to enter new rate tables, such as for long distance communication.

In spite of the existence of these devices, no apparatus exists by which a user may program display boards which are remote from his or her office. It would therefore be desirable and advantageous to devise a system having electronic display boards integral with public telephone booths, capable of being programmed remotely to advertise serveral different messages.

SUMMARY OF THE INVENTION

Accordingly, the primary object of the present invention is to provide a telephone booth with an integral electronic display panel.

Another object of the invention is to provide such a display capable of being remotely programmed.

Still another object of the invention is to provide a system for programming the display whereby normal use of the telephone will not interfere with the programming operation.

Yet another object of the invention is to provide an advertising medium which will respond to the consumer's presence at the point of purchase.

The foregoing objects are achieved in a telephone booth having an electronic display thereon which is capable of receiving programming instructions through a modem in the telephone. A priority message is displayed whenever the telephone receiver is picked up, and messages may be routed to other display boards connected to the telephone booth.

BRIEF DESCRIPTION OF THE DRAWINGS

The novel features believed characteristic of the invention are set forth in the appended claims. The invention itself, however, as well as a preferred mode of use, further objects and advantages thereof, will be be understood by reference to the following detailed description of illustrative embodiments when read in conjunction with the accompanying drawings, wherein:

DESCRIPTION OF THE PREFERRED EMBODIMENTS

Figure 1:
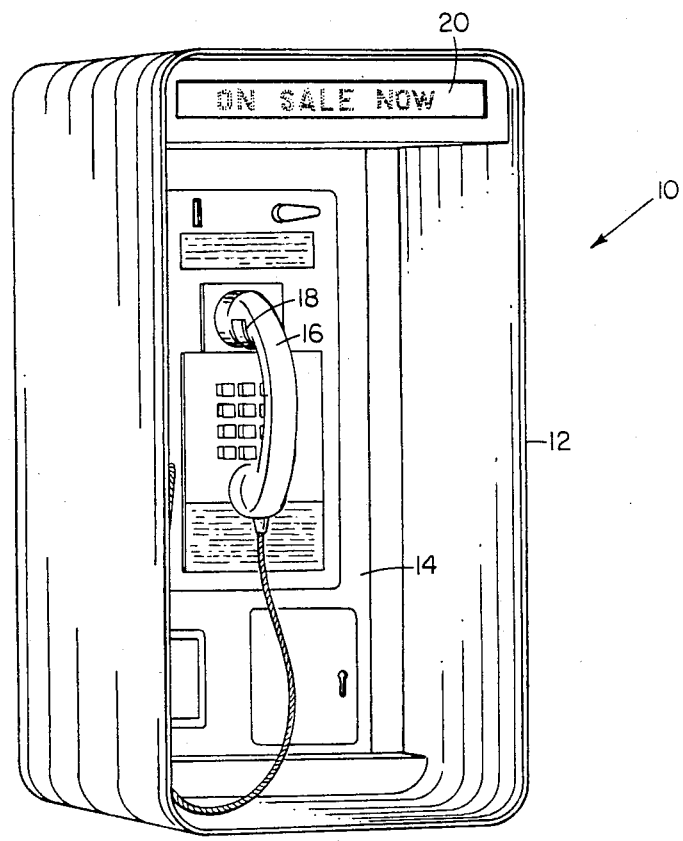
FIG. 1 is a perspective view of a standard telephone showing the electronic display panel.

With reference now to the figures, and in particular with reference to FIG. 1, there is depicted a telephone display unit 10. The display unit 10 is designed for use with pay telephones located in or just outside of convenience stores, supermarkets, etc., where point of purchase advertising is optimized. Display unit 10 is generally comprised of a telephone booth 12, a pay telephone 14 having a receiver handset 16 and the handset cradle 18, and a display panel 20.

Telephone booth 12 is a standard telephone enclosure, such as that manufactured by Acoustics Development Corp. of St. Joseph, Mo. An appropriate pay telephone 14 may be purchased from several different vendors, including any of the Bell Telephone companies, GTE Corporation of San Angelo, Tex., or Intellical, Inc. of Dallas, Tex.

Display panel 20 is a conventional red backlit LED (light emitting diode) message board. In the preferred embodiment, panel 20 is approximately twelve inches long and one inch wide. Characters are approximately 0.7" tall, and eighteen characters are typically displayed at any one time. This number may change according to the selected for presenting the message. Panel 20 should have certain graphics ability for displaying the message in different modes, e.g., vertical and horizontal scrolling, wipe over, zip on, explodes, quick flash, etc. The inventor has found that the LED board manufactured by Leecraft Co., available through Newark Electronics, Inc. of Chicago, Ill., is highly suited to this purpose.

When panel 20 is properly recessed within booth 12 so as to reduce sunlight wash, the messages may be read from up to fifteen feet away during the day, and up to forty feet away at night. It is also advisable to place a clear window in front of panel 20 to protect it from vandalism and the elements. Although the preferred embodiment employs an LED-type panel, it should be understood that alternative electronic display boards are available, such as liquid crystal displays.

Figure 2:
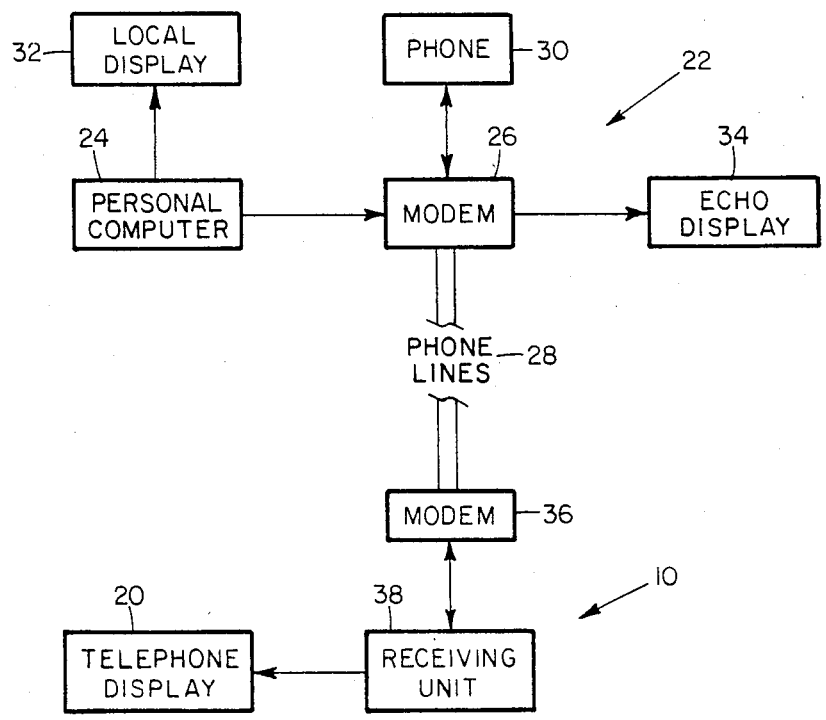
FIG. 2 is a block representation of the interface between the telephone display unit and the remote programming site.

Referring now to FIG. 2, the interface between the telephone display unit 10 and a remote programming site 22 is depicted. A personal computer 24 is used to create the character string (discussed further below in conjunction with FIGS. 4 and 5) which is read by display unit 10 in presenting the various messages. The inventor prefers to use the IBM PC computer made by International Business Machines Corp. Computer 24 communicates with display unit 10 via modem 26 and telephone lines 28. Although any conventional modem will suffice, the inventor presently uses the Radio Shack manual modem 300. A regular telephone 30 may be used to establish the phone link with unit 10 and to monitor data transmission. A local display 32 similar to display panel 20 is connected to computer 24, which allows the user to observe the message contained in the character string before it is actually loaded into display unit 10. Another display 34 is used to receive an echo transmission from display unit 10, thereby confirming that the character string was properly loaded.

Data from computer 24 is received by display unit 10 via another modem 36. Modem 36 is designed for automatic answer, and the inventor prefers to use the AVA-TEX 1200, manufactured in Hong Kong, and available through JDR Microdevices of Los Gatos, Calif. In the simplest embodiment, data is loaded into receiving unit 38, and then routed to display panel 20. Receiving unit 38 is further detailed in FIG. 3, which also depicts additional features not contained in the simplest embodiment.

Figures 3, 5:
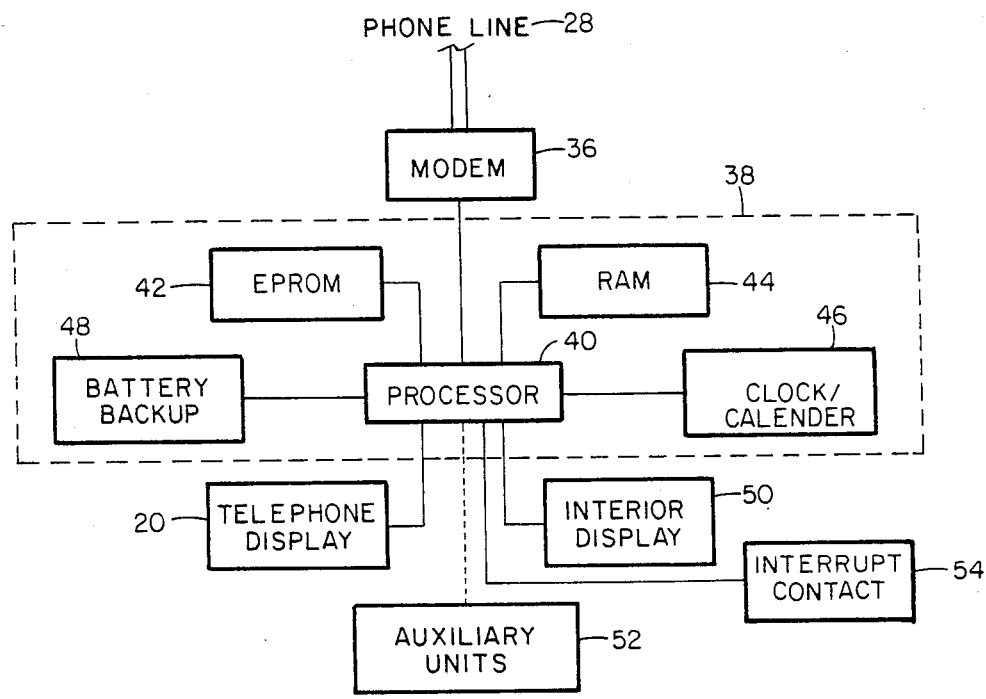
FIG. 3 is a block representation of the hardware configuration of the telephone display unit.
FIG. 5 consists of a series of alphanumeric characters and special symbols comprising the character string sent from the remote programming site to the telephone display unit.

In FIG. 3, it is seen that receiving unit 38 is actually comprised of a central processor 40, an erasable, programmable read-only memory 42 (EPROM), a random access memory 44 (RAM), a real-time clock/calendar 46, and a rechargeable battery backup 48. All of these elements, and modem 36, reside on circuit boards which are placed within the body of telephone 14. Processor 40 executes a program previously stored in EPROM 42 (further explained in conjunction with FIG. 6 below) whereby the character string transmitted from the remote site is stored in RAM 44 and the messages embedded therein are displayed on telephone display panel 20. Clock/calendar 46 may be used to present time-dependent messages in the character string. Battery 48 serves to support the memory for several days in the event of main power failure.

Processor 40 may also be used to transmit the messages to an interior display 50. As mentioned above, it is contemplated that display unit 10 will be used by convenience stores, supermarkets, etc., and it therefore would be desirable to have displays inside the store which could be programmed remotely through the telephone display unit 10. In this alternative embodiment, the same message being flashed on display panel 20 would also be flashed on interior display 50. An interior display board would typically have dimensions ranging from 40"×6" to 140"×12". Character height would be in the range of two inches to nine inches. Interior display 50 should have the same graphics ability of display panel 20 discussed above.

Processor 40 may be used to route a number of totally different character strings to auxiliary units 52. For example, most convenience stores have several outside telephone booths, and each one could be equipped with receiving units 38 and display panels 20. It would be desirable, however, to provide a single modem hookup which could communicate with each of these telephones. As explained below, the system operator could create several different message strings, and place a unit identifier on each such string. Then, when a given string was transmitted to the primary display unit 10, processor 40 would first determine which telephone unit the messages should be displayed at. If the character string is targeted for some unit other than primary unit 10, then the processor 40 would route the string to the appropriate telephone. In this manner, many such strings may be loaded into several different telephone units during a single transmission operation.

Separate and apart from the ability to remotely program telephone display units, the present invention has the further novelty of providing a priority message which is displayed in response to the customer's presence at the point of purchase. In the preferred embodiment, the metal tab within cradle 18 (not shown) forms a simple on-off switch, or interrupt contact. Thus, when handset 16 is removed from cradle 18, interrupt contact 54 closes. Processor 40 is continually checking the state of interrupt contact 54, and when it closes, the normal message string is interrupted, and a priority message is flashed on display panel 20 (the priority message would normally not be shown on the interior display). The marketing advantage in having such a priority message is self-evident. Although it is contemplated that interrupt contact 54 will be responsive to removal of handset 16 from cradle 18, the contact may alternatively be attached to door switches, pressure sensitive floor switches, electric eyes, etc. Thus, even without remote programmability, the display unit 10 contains advantageous features not disclosed in the prior art.

OPERATION

Figure 4:
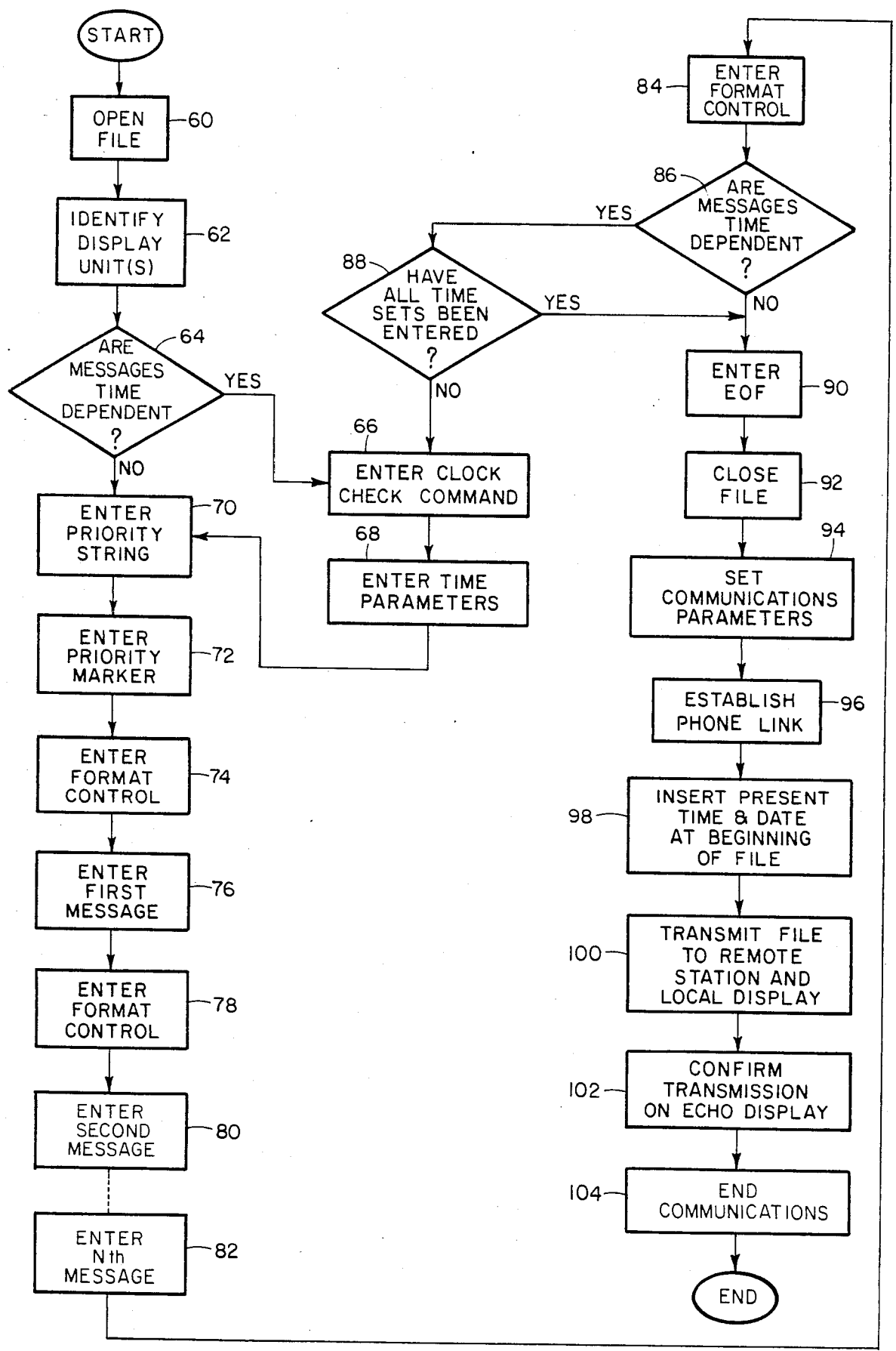
FIG. 4 is a flow chart depicting the steps in the control program carried out at the remote programming site.
Figure 6:
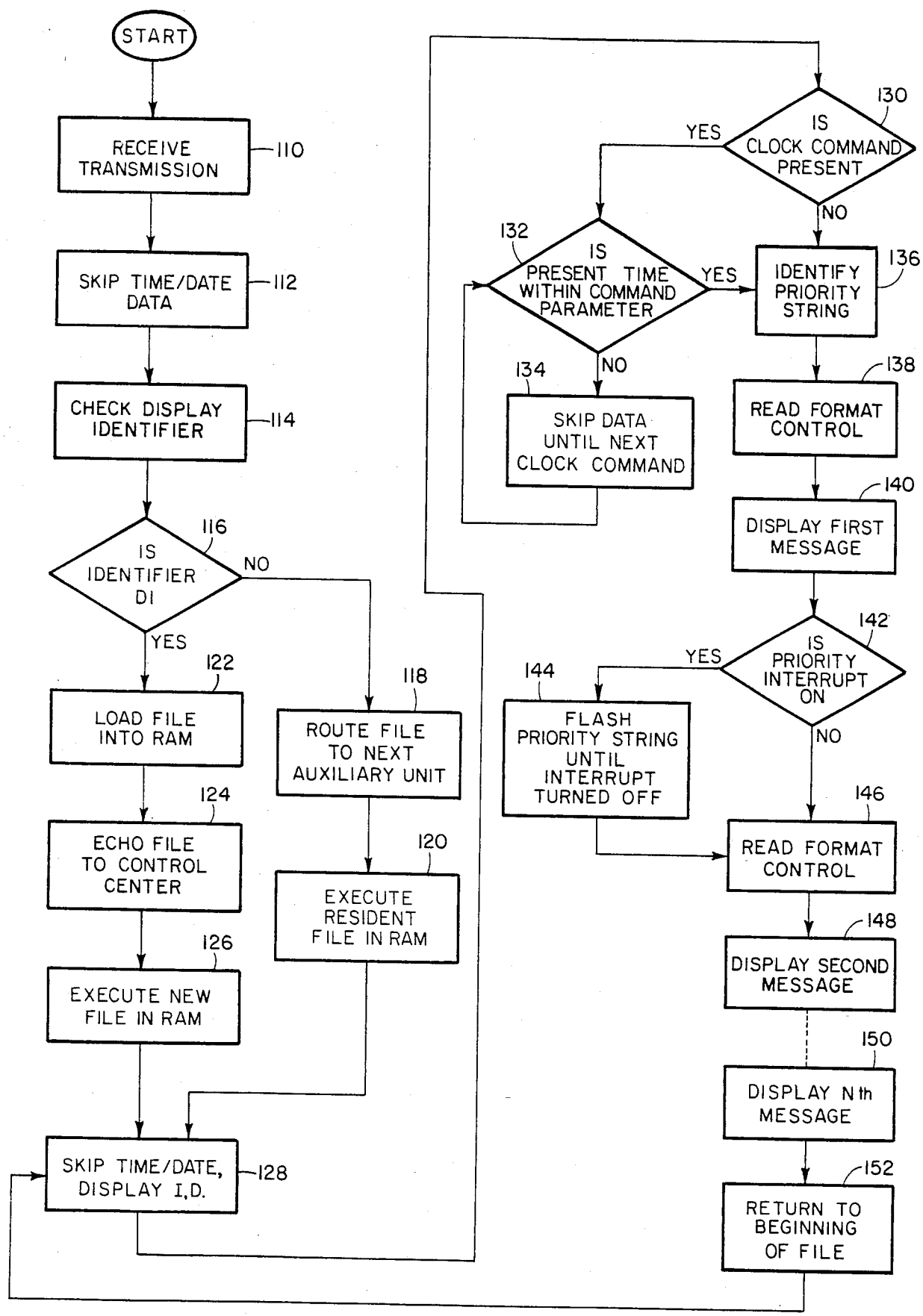
FIG. 6 is a flow chart depicting the steps performed by the telephone display unit in processing the character string sent from the remote programming site.

The operation of display unit 10 may best be understood with reference to FIGS. 4, 5, and 6. FIG. 4 is a diagram of the flow of the control program which creates the character string eventually displayed on panel 20. This program is stored and executed in computer 24. The first function performed by the computer 24 is to open a standard ASCII file (60), which will become the character string. The operator then inputs (62) the display unit identifier (e.g., D1, D2, etc). This is appropriate only when auxiliary units 52 are coupled to the primary display unit 10. Next, the operator must decide if the messages are to be time-dependent (64). For example, different messages may be flashed to the coffee and donut customer in the morning, changing to sandwiches and soft drinks in the afternoon, and then addressing the beer and chip customer in the evening. If this is desired, a clock-check command must be entered (66), followed by the time/date parameters(68).

The first actual message placed in the file is the priority striang which is to be flashed when interrupt contact 54 is closed (70). Although the priority string could be placed near the end of the file, the inventor has found it more convenient to place it at the beginning of the message string. The priority string is terminated by placing a priority marker at the end thereof (72), the priority marker being an unusual combination of special symbols, such as "$#*."

The rest of the file is composed of several different messages (76, 80, 82), each preceded by a formal control (74, 76, 84) which regulates the manner in which the message enters and exits display panel 20. If the messages were previously designated as being time-dependent (86), each message subset within the file must be preceded by a clock-check command and time/date parameters (88). Care should be taken to insure that message strings have been entered for all twenty-four hours of each day of the week.

After all messages are entered, the file is closed (90, 92). At this time, the file may be saved for later transmission to display unit 10, or it may be immediately transmitted. The computer 24 sets the communication parameters for modem 26 (94). After the phone link is established (96), the present time and date is inserted at the very beginning of the ASCII file (98). This allows later users to determine when that particular character string was loaded. The file is then transmitted to receiver unit 38, while simultaneously being routed to local display 32 (100). As discussed below, the character string is echoed back by processor 40, and displayed on echo display 34. This allows the operator to confirm that the string was properly transmitted (102). After transmission is complete, modem 26 terminates communications, and the program is finished (104).

FIG. 5 shows a sample character string which has been designed so as to demonstrate all of the options previously discussed. The first ten characters are all digits, representing the time and date that this particular file was transmitted; thus "0131870330" means that the file was sent on Jan. 31, 1987, at 3:30 a.m. The next entry is "D1," indicating that this particular string is intended to be displayed on the primary display unit 10, as opposed to some auxiliary unit 52. The pair of characters " ^N" are used as a control command to indicate that the following messages are time dependent. The caret symbol "^" is always read in conjunction with the next letter, and indicates a control command. Since the messages in this file are time dependent, the time/date parameters must follow the clock check command. In the example of FIG. 5, the first message string is to be displayed only on Sundays from six o'clock in the morning to eleven-thirty.

The priority string follows the time/date parameters. The delta symbols do not actually appear in the file, but are included in FIG. 5 only to represent spaces. The priority string "HAVE A NICE DAY" is identified by the marker "$#*." The next entry is a format control for the first message in the message string. A control-H is used to indicate that the following message "ON SALE NOW" should be horizontally scrolled onto display panel 20. The control-W indicates that the companion message "HOT DOGS $1.25" is to be wiped over the prior message. This first message string may continue with dozens of formal controls and corresponding messages; the end of the string is indicated by the first set of ellipses. The next time-dependent string in the file, also preceded by a control-N, is the message string to be displayed from 11:31 a.m. to midnight on Sundays.

FIG. 6 shows the flow of the program which resides in EPROM 42 and is executed by processor 40. When the ASCII file is first received by processor 40, the first ten characters (time/date information) are skipped over (110, 112). If auxiliary units 52 are being used, the display identifier is checked (114); if the identifier is not "D1", the processor routes the file to the next auxiliary unit (118), and executes the resident character string already in RAM 44 (120). Thus, the auxiliary units are preferably connected in series. Note that the control program resides not only in display unit 10, but also in each of the auxiliary units 52. However, as can be seen by examining the first conditional box (116) in FIG. 6, each program is tailored so as to only accept files which are destined for that particular unit.

If auxiliary units are not being used, or the display identifier is "D1," then the file is loaded into RAM 44 and echoed to echo display 34 (122, 124). When the character string is executed (126), the time/date data is again skipped along with the display identifier (128). The program then looks for the clock check command (130). If present, the program checks the time parameters against the actual time and date given by clock/calendar 46 (132). If the present time is within the control parameters, that message string is sent to display panel 20; otherwise, the program skips through the data until another clock command is found. The process is repeated until the proper time-dependent message sequence is located (134).

Once the program has recognized the proper message sequence, the priority string is identified (136), and the processor displays the various messages according to the format controls (138, 140, 146, 148, 150). Whenever handset 16 is removed from cradle 18, the interrupt signal is detected (142), and the priority message is flashed, interrupting the normal message string. The priority message is flashed until the handset is replaced (144). This entire procedure is repeated whenever the end-of file marker is reached (152).

With some older phones existing in the marketplace, a potential user of telephone 14 who picks up handset 16 during transmission of the character string will disrupt the transmission. Newer phones will be inoperable during the down-load operation and may be programmed to deliver a verbal message through handset 16 requesting the user to try again in a few minutes. Because of this, it is advisable to transmit the character string during non-peak hours of telephone usage. Moreover, anyone who knows the local phone number of pay telephone 14 might attempt to communicate with processor 40 in an unauthorized manner. Because of this, processor 40 should be programmed to ignore incoming calls, or disconnect modem 36, except during a small "window" of time. Preferably, modem 36 is only operational for a period of about fifteen minutes to half an hour during the early morning, e.g., from about 3:00 a.m. to 3:30 a.m. Alternatively, EPROM 42 might have a secret access code therein to prevent unauthorized programming of processor 40.

Although the invention has been described with reference to specific embodiments, this description is not meant to be construed in a limiting sense. Various modifications of the disclosed embodiment, as well as alternative embodiments of the invention will become apparent to persons skilled in the art upon reference to the description of the invention. It is therefore contemplated that the appended claims will cover such modifications that fall within the true scope of the invention.

I claim:

1. A display unit for a telephone comprising:
   display means attached to an exterior portion of said telephone;

a modem connected to said telephone for receiving a character string transmitted over telephone lines, said character string having a plurality of messages embedded therein;

central processor means for decoding a plurality of clock commands associated with said plurality of messages embedded in said character string and continuously and repeatedly displaying said plurality of messages on said display means in a time-dependent mode;

memory means connected to said processor means for storing program instructions and said character string; and clock/calendar means connected to said processor means, for providing present time and day.

2. The telephone display unit of claim 1 wherein said memory means includes an erasable, programmable read-only memory for storing said program instructions and a random-access memory for storing said character string, and further comprising a rechargeable battery connected to said processor means for supplying electrical power to said processor means in the event of main power loss.

3. The telephone display unit of claim 2 wherein said display means comprises an electronic display panel for displaying said messages in a variety of formats.

4. The telephone display unit of claim 3 wherein said electronic display board is of the light-emitting diode type.

5. The telephone display unit of claim 4 further comprising a second display for displaying said messages at a location removed from said telephone, said second display being connected to said processor means.

6. The telephone display unit of claim 4, further comprising one or more auxiliary units, each of said auxiliary units having auxiliary processor means and auxiliary display means, each of said auxiliary processor means being connected to said central processor means, and said character string having an identifier therein corresponding to a targeted one of said auxiliary units, whereby said central processor means discriminates which of said auxiliary units said character string is targeted for and routes said character string to said targeted auxiliary unit.

7. The telephone display unit of claim 1 further comprising a second display for displaying said messages at a location removed from said telephone, said second display being connected to said processor means.

8. The telephone display unit of claim 1, further comprising one or more auxiliary units, each of said auxiliary units having auxiliary processor means and auxiliary display means, each of said auxiliary processor means being connected to said central processor means said character string having an identifier therein corresponding to a targeted one of said auxiliary units, whereby said central processor means discriminates which of said auxiliary units said character string is targeted for and routes said character string to said targeted auxiliary unit.

9. The telephone display unit of claim 1 wherein said character string additionally has a priority message embedded therein, further comprising means for displaying said priority message on said display means whenever said telephone is being used.

10. The telephone display unit of claim 9 wherein said telephone has a handset and a cradle for supporting said handset during nonuse of said telephone, said cradle being coupled to an interrupt contact which is open when said handset rests in said cradle and is closed when said handset is removed from said cradle, said interrupt contact being connected to said processor means, whereby said priority message is displayed on said display means whenever said handset is removed from said cradle.

11. A display unit for a telephone, comprising:

a primary display panel attached to a visible, exterior portion of said telephone;

a secondary display panel distant from said telephone;

a modem for receiving a character string transmitted over telephone lines, said modem located within said telephone, and said character string having one or more messages embedded therein;

a central processor connected to said modem and said primary and secondary display panels, for decoding a plurality of clock commands associated with said one or more messages embedded in said character string and displaying said one or more messages on said primary and secondary display panels continuously and repeatedly in a time-dependent mode;

an erasable, programmable read-only memory connected to said central processor for storing program instructions for said processor;

a random-access memory connected to said central processor for storing said character string; and an electronic clock/calendar connected to said central processor for providing information on present time and day.

12. The telephone display unit of claim 11, further comprising one or more auxiliary units, each of said auxiliary units having auxiliary processor means and auxiliary display means, each of said auxiliary processor means being connected to said central processor, said character string having an identifier therein corresponding to a targeted one of said auxiliary units, whereby said central processor discriminates which of said auxiliary units said character string is targeted for and routes said character string to said targeted auxiliary unit.

13. The telephone display of claim 11 wherein said character string additionally has a priority message embedded therein, said telephone has a handset and a cradle for supporting said handset during nonuse of said telephone, said cradle being coupled to an interrupt contact which is open when said handset rests in said cradle and is closed when said handset is removed from said cradle, said interrupt contact being connected to said central processor, whereby said priority message is displayed on said primary display panel whenever said handset is removed from said cradle.

14. A method of displaying one or more messages on a display panel attached to an exterior portion of a telephone, said method comprising the steps of:

creating a character string having said messages and associated format controls embedded therein by means of a computer at a remote site, said creating step including placement of clock commands in said character string, said clock commands being associated with said messages;

transmitting said character string over telephone lines to processor means located within and connected to said telephone, said transmitting step being achieved by use of a modem connected to said telephone and said processor means, and said processor means comprising a central processor connected to said display panel, an erasable, programmable read-only memory connected to said central processor for storing program instructions, a random-access memory connected to said central processor for storing said character string, and an electronic clock-calendar connected to said central processor for providing information on present time and day;

decoding said clock commands, said messages, and said associated format controls embedded in said character string by means of said processor; and displaying said messages on said display panel in a time-dependent mode.

15. The method of claim 14 wherein said creating step further includes placement of a priority message in said character string, whereby said processor means displays said priority message on said display panel when an interrupt contact is closed, said interrupt contact being connected to said central processor, and being coupled to said telephone so as to close only when said telephone is in use.

* * * * *